Aug. 8, 1950        W. J. PARDUCCI        2,517,596
VALVE
Filed May 31, 1946
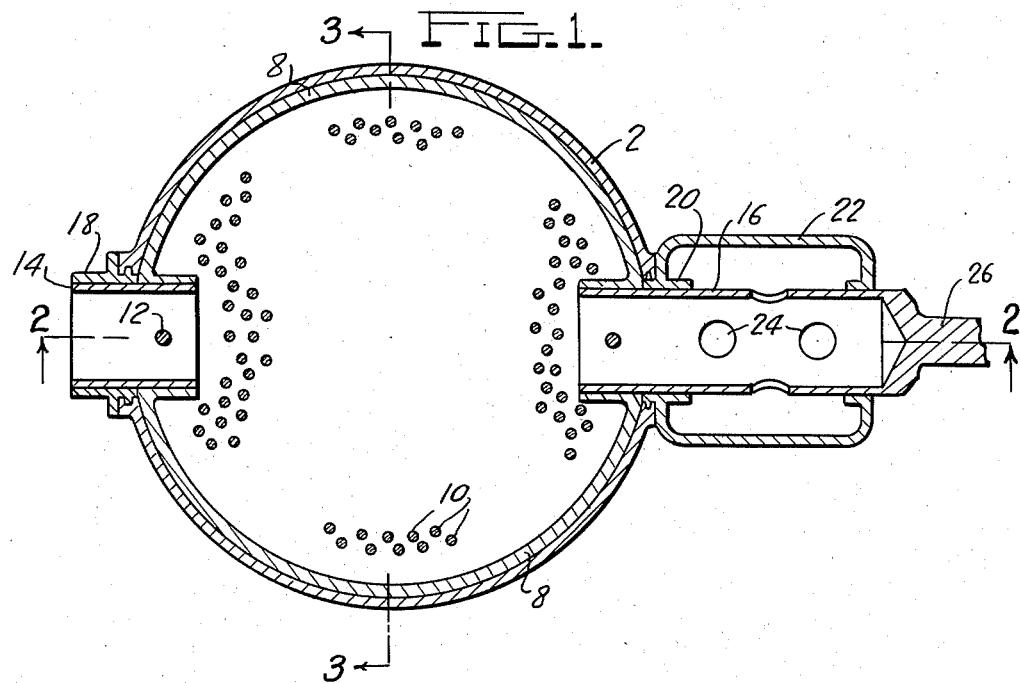
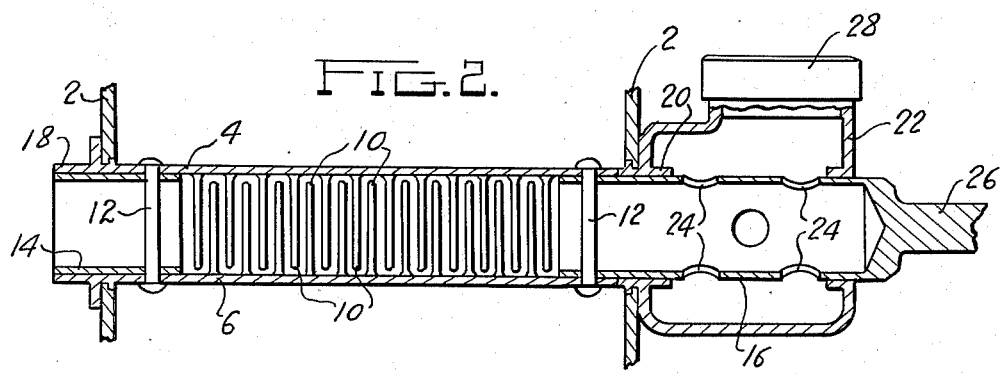
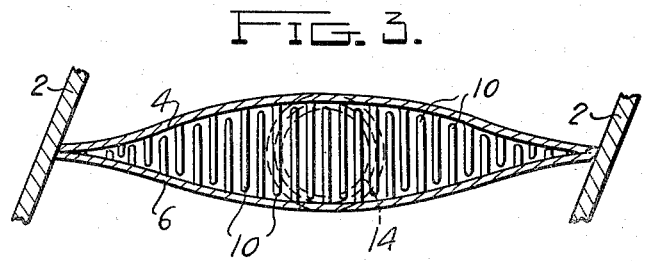
INVENTOR.
William J. Parducci
BY
Hauke & Hardesty
ATTORNEYS Patented Aug. 8, 1950

2,517,596

UNITED STATES PATENT OFFICE 2,517,596

VALVE

William J. Parducci, Detroit, Mich., assignor to Continental Aviation & Engineering Corporation, Detroit, Mich., a corporation of Virginia Application May 31, 1946, Serial No. 673,495

2 Claims. (Cl. 251—12)

This invention relates to a valve, especially to a valve which is subjected to high temperatures and which should be cooled for long life.

There are certain applications which logically call for some type of cut-off valve, but in which the conditions are such that valving is difficult if not impossible. One such application is in the nozzle-box of gas turbines. Efficient operation of a gas turbine calls for high temperature operation. Furthermore, most efficient operation suggests the development of a method for cutting off the supply of energy fluid to some of the nozzles under certain conditions. But such a cut-off valve would have to operate in such high temperatures that the design difficulties are very great, owing to warping, scaling, corrosion, and the like, all of which are magnified at elevated temperatures.

It is the object of this invention to provide a valve which can be easily and effectively cooled to permit operation in a high temperature atmosphere. This object is accomplished in a butterfly-type valve which is hollow to permit the passage through it of a coolant.

In the drawings:

Fig. 1 is an axial sectional view through the valve;

Fig. 2 is a view in section substantially on the line 2—2 of Fig. 1; and

Fig. 3 is a view in section on line 3—3 of Figure 1.

A fluid energy conduit 2 is shown provided with a valve made according to the invention. The valve is shown in the closed position.

The valve is a butterfly-type closure and comprises spaced apart closure members or plates 4 and 6, same particularly comprising outwardly convex discs or saucers as illustrated and joined at their periphery 8. Plates 4 and 6 have integral therewith a plurality of heat conductors in the form of fingers 10. As can be seen from Fig. 2, substantially half of the fingers 10 are integral with plate 4, and the remainder are integral with plate 6. The fingers of each plate extend toward the opposite plate, and may even touch the opposite plate if desired. Normally, however, the fingers will not quite touch the opposite plate. Fingers 10 are disposed throughout the space between plates 4 and 6.

Substantially at the opposite ends of a diameter, plates 4 and 6 are secured as by means of rivets 12 to pivots 14 and 16. Pivots 14 and 16 operate in sleeves or bushings 18 and 20 respectively, bushings 18 and 20 being non-rotatable with respect to the conduit 2. Pivots 14 and 16 serve as conduits for a coolant fluid, conduit 16 communicating the space between plates 4 and 6 with a connection adapted to receive coolant fluid. This connection takes the form of a receiver 22 which encompasses the pivot 16. Openings 24 provided in the walls of pivot or conduit 16 permit communication from the receiver 22 to the interior of pivot 16 and thence to the space between plates 4 and 6.

Integral with pivot 16 is a spindle 26 to which suitable linkage will be connected for the actuation of the valve. It will be seen that pivot 16 is rotatable relatively to the connection 22.

Operation

In operation energy fluid at an elevated temperature passes through the conduit 2. When it is desired to cut off the flow of energy fluid through conduit 2 the valve of this invention is turned into the closed position, shown in the drawings. The valve is kept cool in the presence of the high temperature energy fluid by means of coolant fluid introduced into receiver 22 at the inlet 28. From the interior of receiver 22 coolant fluid passes through openings 24 into the interior of pivot 16, thence between plates 4 and 6 coming into contact with heat conductor fingers 10 and passes out through the connection provided by pivot 14. Cooling of the assembly is independent of the position of the valve, because the pivot-conduits 14 and 16 function in all angular positions of the valve. The connection comprising receiver 22 is stationary with respect to conduit 2, and provides for easy connection to a source of coolant fluid.

I claim:

1. In a gas turbine engine, an energy fluid conduit, a valve for said fluid energy conduit and comprising at least two coaxial hollow pivots, a pair of spaced outwardly convex saucer-like closure members joined at their periphery and mounted on the pivots, heat conductors between the members and comprising a plurality of closely spaced pins projecting normal with respect to the plane of said closure members and substantially filling the space between said closure members to provide an irregular tortuous path for the flow of coolant fluid, and means to supply a coolant fluid to one of the pivots.

2. In a gas turbine engine, an energy-fluid conduit circular in cross section, a pair of coolant-fluid conduits through the energy-fluid conduit and rotatable relatively thereto, spaced apart outwardly convex saucer-like closure members supported by the coolant-fluid conduits, the members being joined at their periphery, heat conductors disposed between the members and comprising a plurality of closely spaced pins projecting substantially normal from both said members into the space between and substantially filling said space between the closure members to provide an irregular tortuous path for the flow of coolant fluid, and a coolant-fluid receiver encompassing a coolant fluid conduit and communicating with the interior thereof, the receiver being stationary with respect to the energy-fluid conduit.

WILLIAM J. PARDUCCI.

REFERENCES CITED

The following references are of record in the file of this patent:

UNITED STATES PATENTS

| Number | Name | Date |
|---|---|---|
| 567,011 | Smith | Sept. 1, 1896 |
| 1,914,084 | Ellis | June 13, 1933 |
| 2,064,201 | Fox | Dec. 15, 1936 |